(12) United States Patent
Ziech et al.

(10) Patent No.: US 6,866,295 B2
(45) Date of Patent: Mar. 15, 2005

(54) MODULAR CAST INDEPENDENT FRONT SUSPENSION SUBFRAME

(75) Inventors: James F. Ziech, Kalamazoo, MI (US); Michael L. Zebolsky, Marshall, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/772,785

(22) Filed: Jan. 30, 2001

(65) Prior Publication Data

US 2002/0113394 A1 Aug. 22, 2002

Related U.S. Application Data

(60) Provisional application No. 60/258,823, filed on Dec. 28, 2000.

(51) Int. Cl.[7] .............................................. B62D 21/11
(52) U.S. Cl. ............................. 280/785; 280/124.109; 180/312
(58) Field of Search ................................ 280/785, 788, 280/124.109, 160, 104; 180/311, 312, 218, 225, 235, 346

(56) References Cited

U.S. PATENT DOCUMENTS

| | | |
|---|---|---|
| 1,743,436 A | 1/1930 | Davis et al. |
| 2,611,625 A | 9/1952 | Kishline et al. ........... 280/96.2 |
| 2,997,313 A | 8/1961 | Wall |
| 3,093,390 A | 6/1963 | Muller |
| 3,119,628 A | 1/1964 | Muller .................... 280/106.5 |
| 3,243,007 A | 3/1966 | Berckhan |
| 3,601,425 A * | 8/1971 | Achille ....................... 280/104 |
| 3,729,210 A | 4/1973 | Cunningham, Jr. ..... 280/96.2 R |
| 3,856,323 A | 12/1974 | Arning et al. ......... 280/96.2 R |
| 3,958,653 A | 5/1976 | Arning et al. .............. 180/157 |
| 4,057,120 A * | 11/1977 | Roethlisberger ..... 280/124.135 |
| 4,240,517 A * | 12/1980 | Harlow et al. .............. 280/160 |
| 4,514,891 A * | 5/1985 | Draper ........................ 296/188 |
| 4,534,575 A * | 8/1985 | Grove et al. ................. 280/104 |

(List continued on next page.)

FOREIGN PATENT DOCUMENTS

| | | | |
|---|---|---|---|
| DE | 4322717 A1 | 1/1995 | |
| EP | 295661 * | 6/1988 | ................. 280/160 |
| EP | 295662 * | 6/1988 | ................. 280/160 |
| EP | 301219 * | 6/1988 | ................. 280/160 |
| EP | 0530594 A1 | 8/1992 | |
| EP | 0806310 A2 | 3/1997 | |
| EP | 1010605 A2 | 10/1999 | |
| FR | 2615458 A1 | 5/1987 | |
| GB | 2313578 A | 5/1997 | |
| WO | WO02/26548 A1 | 4/2002 | |

OTHER PUBLICATIONS

International Preliminary Examination Report of International Preliminary Examining Authority in Intl. App. No. PCT/US01/50337 (Apr. 7, 2003), 10 pages.

(List continued on next page.)

*Primary Examiner*—Paul N. Dickson
*Assistant Examiner*—Toan C To
(74) *Attorney, Agent, or Firm*—Dykema Gossett PLLC (57) ABSTRACT

A suspension and steering subassembly for a heavy truck is provided including a subframe. The subframe includes first and second side members extending substantially in the direction of vehicle travel and first and second cross members extending substantially perpendicular to the direction of vehicle travel. The first and second cross members are integral with the first and second side members such that the subframe is a unitary member. The first and second side members and the first and second cross members are further configured to receive first and second lower suspension control arms, first and second upper suspension control arms, and a portion of the steering linkage for the vehicle. The subframe may further be configured to receive a steering gear and one or more strut rods to provide fore/aft support to the subframe.

8 Claims, 6 Drawing Sheets

U.S. PATENT DOCUMENTS

| | | | | |
|---|---|---|---|---|
| 4,723,791 A | * | 2/1988 | Miura et al. | 280/716 |
| 4,773,335 A | * | 9/1988 | Smith et al. | 280/160 |
| 4,817,986 A | * | 4/1989 | Kanazawa et al. | 280/781 |
| 5,088,573 A | * | 2/1992 | Moll | 280/104 |
| 5,375,870 A | | 12/1994 | Smith et al. | 280/668 |
| 5,556,133 A | * | 9/1996 | Oku et al. | 280/160 |
| 5,560,651 A | * | 10/1996 | Kami et al. | 280/788 |
| 5,562,308 A | * | 10/1996 | Kamei et al. | 280/788 |
| 5,609,366 A | * | 3/1997 | Kamei et al. | 280/160 |
| 5,879,026 A | | 3/1999 | Dostert et al. | 280/781 |
| 5,918,893 A | | 7/1999 | Marquardt et al. | 280/124.109 |
| 6,003,897 A | | 12/1999 | Dostert et al. | 280/781 |
| 6,003,900 A | * | 12/1999 | Hasegawa et al. | 280/834 |
| 6,045,317 A | * | 4/2000 | Bourcher et al. | 280/160 |
| 6,269,902 B1 | * | 8/2001 | Miyagawa | 180/312 |
| 6,357,769 B1 | * | 3/2002 | Omundson et al. | 280/124.109 |
| 6,398,262 B1 | * | 6/2002 | Ziech et al. | 280/785 |
| 6,527,286 B2 | * | 3/2003 | Keeler et al. | 280/124.135 |

OTHER PUBLICATIONS

Written Opinion of International Preliminary Examining Authority in Intl. App. No. PCT/US01/50337 (Aug. 27, 2002), 2 pages.

Written Opinion of International Preliminary Examining Authority in Intl. App. No. PCT/US01/50337 (Dec. 5, 2002), 4 pages.

* cited by examiner

FIG.9

MODULAR CAST INDEPENDENT FRONT SUSPENSION SUBFRAME

This application claims priority to U.S. Provisional Patent Application No. 60/258,823 filed Dec. 28, 2000.

BACKGROUND OF THE INVENTION

1. Field of the Invention

This invention relates to vehicle suspensions and, in particular, to a subframe for use in an independent front suspension system.

2. Disclosure of Related Art

It is conventional in motor vehicles having independent front suspensions to incorporate a subframe to increase the strength of the axle on which the suspension is employed. Conventional subframes used in heavy truck applications, however, have suffered from several drawbacks. First, most conventional subframes include numerous members that are coupled together using bolts, welds, or other fastening means. The assembly of these members into a single subframe makes dimensional control of mounting points for suspension and steering components relatively difficult thereby increasing wear on the suspension components and joints among other drawbacks. The assembly also increases the time and cost required to produce the subframe. Second, conventional subframes have generally been unable to accommodate suspension control elements and steering components to allow the building of a single suspension and steering subassembly. Third, conventional subframes are relatively heavy and consume a relatively large amount of space.

There is thus a need for a subframe for motor vehicles that will minimize or eliminate one or more of the above-mentioned deficiencies.

SUMMARY OF THE INVENTION

The present invention provides a subframe for a motor vehicle and, in particular, for heavy trucks.

A subframe in accordance with the present invention includes first and second side members. These side members may extend substantially in the direction of vehicle travel. The subframe also includes first and second cross members. The cross members may extend substantially perpendicular to the direction of vehicle travel. The first and second cross members are integral with the first and second side members such that the subframe is a unitary member. The first and second side members and the first and second cross members are further configured to receive first and second lower suspension control arms and first and second upper suspension control arms. The subframe may also be configured to receive and support a portion of the steering linkage for the vehicle. The subframe may further be configured to receive one or more strut rods to provide fore/aft support to the subframe. Finally, the subframe may include a engine mount cross member integral with the first and second side members and first and second cross members.

A subframe in accordance with the present invention has several advantages as compared to conventional subframes used in heavy truck applications. First, because the members of the subframe are integral with one another, there are no bolts, welds, or other fasteners required. As a result, assembly time and cost is reduced. More importantly, better dimensional control of suspension and steering mounting points is ensured. Second, the subframe allows relatively easy manufacture and production of a subassembly including many of the conventional suspension and steering components. Third, the subframe is relatively light as compared to conventional subframes and requires less space.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
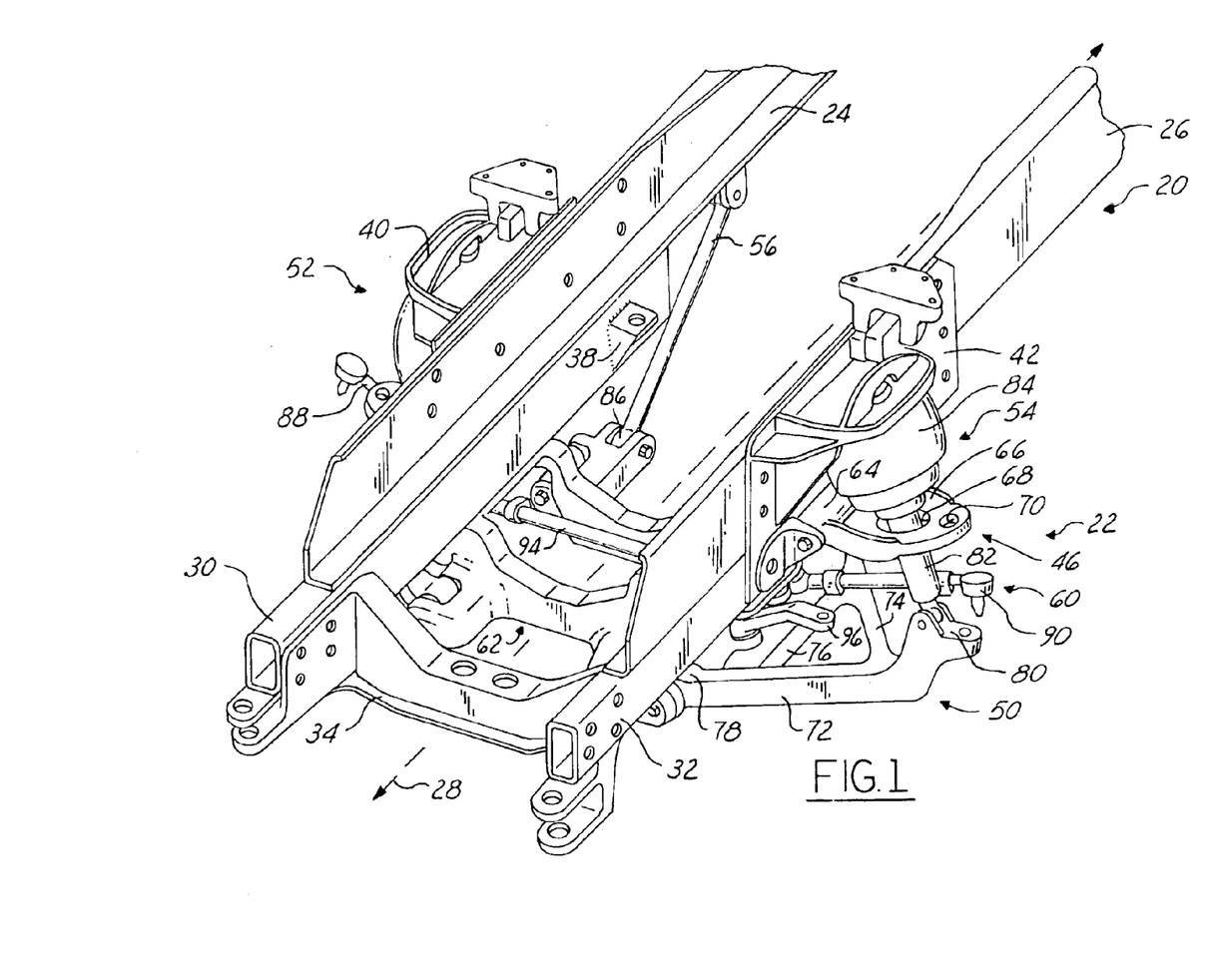
FIG. 1 is a perspective view of a vehicle frame having a suspension and steering subassembly with a subframe in accordance with the present invention.
Figure 2:
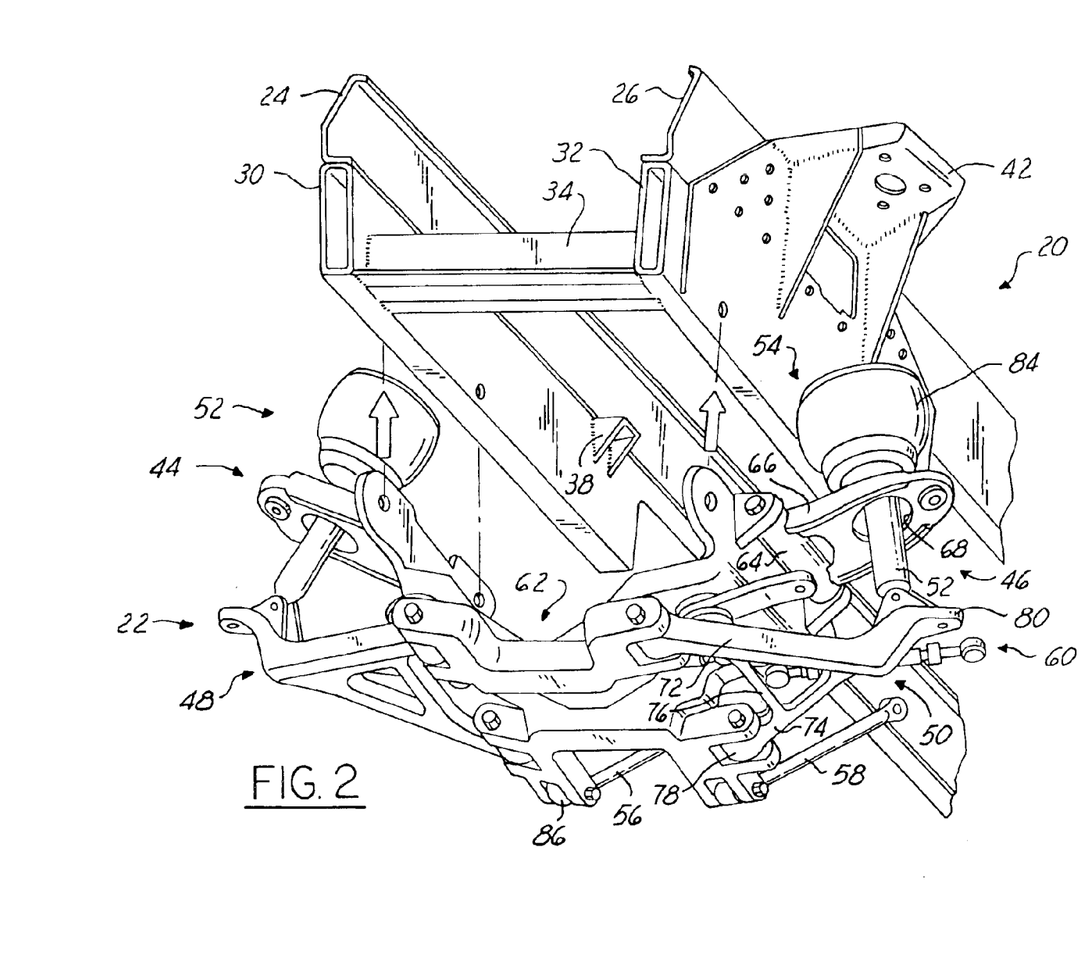
FIG. 2 is an exploded perspective view of the vehicle frame and suspension and steering subassembly of FIG. 1.

Referring now to the drawings wherein like reference numerals are used to identify identical components in the various views, FIGS. 1–2 illustrate a vehicle frame 20 to which is coupled a suspension and steering subassembly 22 in accordance with the present invention. The illustrated frame 20 and subassembly 22 are configured for use in heavy truck applications. It should be understood, however, that the present invention may find application in other types of vehicles.

Frame 20 is provided to support an engine (not shown), cab (not shown) and other components of a heavy truck. Frame 20 is conventional in the art and may be made from conventional metals and metal alloys such as steel. Frame 20 includes a pair of longitudinal rails 24, 26 extending parallel to an axis 28 that extends in the direction of vehicle travel and in the longitudinal direction of the truck. Frame 20 also includes a pair of reinforcement members 30, 32 and a cross-member 34. Frame may also include a plurality of mounting brackets including brackets 38, 40, 42.

Rails 24, 26 are provided to secure and align a cab on frame 20 and are conventional in the art. Rails 24, 26 are generally C-shaped in cross-section and open toward one another. Rails 24, 26 may include a plurality of apertures configured to received bolts, screws, or other fasteners to secure mounting brackets 38, 40, 42 to rails 24, 26.

Reinforcement members 30, 32 provide additional torsional stiffness to frame 20 and are conventional in the art. Members 30, 32 support, and are disposed below, rails 24, 26 respectively. Members 30, 32 are tubular in construction and are rectangular in cross-section in the illustrated embodiment. Members 30, 32 may be coupled to rails 24, 26 using bolts, screws, welds, or other fastening means.

Cross-member 34 is provided to support the vehicle engine (not shown) and is also conventional in the art. Member 34 may be cast from aluminum. Member 34 is fastened to reinforcement members 30, 32 using bolts, screws, welds, or other fastening means and extend in a direction that is generally transverse to axis 28 and the direction of vehicle travel.

Brackets 38, 40, 42 are provided to mount various components of the vehicle to frame 20 and are conventional in the art. Bracket 38 provides a mounting point for the vehicle engine. Brackets 40, 42 provide mounting points for elements of subassembly 22. It will be understood by those in the art that the number, shape, and configuration of brackets 38, 40, 42 may vary depending upon the design requirements of subassembly 22 and other components of the vehicle.

Suspension and steering subassembly 22 provides an independent front suspension and steering system for the vehicle. Subassembly 22 may include upper suspension control arms 44, 46, lower suspension control arms 48, 50, shock/spring units 52, 54, strut rods 56, 58, a steering linkage 60, and a subframe 62 in accordance with the present invention.

Upper and lower suspension control arms 44, 46, 48, 50 provide a means for mounting steering knuckles (not shown) on either side of the vehicle and adjustment of the vehicle wheels (not shown) Arms 48, 50 also provide mounting points for shock/spring units 52, 54. Arms 44, 46, 48, 50 are conventional in the art and may be made from a variety of conventional metals and metal alloys. In the illustrated embodiment, each of upper control arms 44, 46 includes a bushing 64 from which a generally semi-circular flange 66 extends. Bushing 64 is received by subframe 62 as described in greater detail hereinbelow. Flange 66 includes an aperture 68 configured to allow one of shock/spring units 52, 54 to extend therethrough and another aperture 70 through which flange 66 may be coupled to a steering knuckle (not shown). Each of lower suspension control arms 48, 50 is generally A-shaped including a pair of legs 72, 74 and a cross-member 76. A bushing 78 is disposed at the inboard end of each leg 72, 74 and is received by subframe 62 as described hereinbelow. Legs 72, 74 define a mounting member 80 at the outboard intersection of legs 72, 74 for mounting one of shock/spring units 52, 54 and a steering knuckle (not shown). It should be understood by those of skill in the art that the size, shape, and configuration of arms 44, 46, 48, 50 may vary depending upon design requirements associated with vehicle and its components without departing from the spirit of the present invention.

Shock/spring units 52, 54 are provided to cushion the ride of vehicle. Units 52, 54 are conventional in the art any may include a shock 82 and an air spring 84. Shock 82 is supported at one end by mounting member 80 of lower suspension control arm 50. The other end of shock 82 extends into a bladder of air spring 84. Air spring 84 is disposed against mounting bracket 42 of frame 20.

Strut rods 56, 58 act to stabilize subframe 62 under brake loads by providing additional fore/aft support to subframe 62 and also minimizing stress due to helical loading from frame 20. Rods 56, 58 are conventional in the art. Rods 56, 58 are pivotally mounted to frame 20 at one end and to subframe 62 at the other end using bushings 86, rubber isolators or other ball style joints designed to allow pivotal motion, but limited radial travel.

Figure 3:
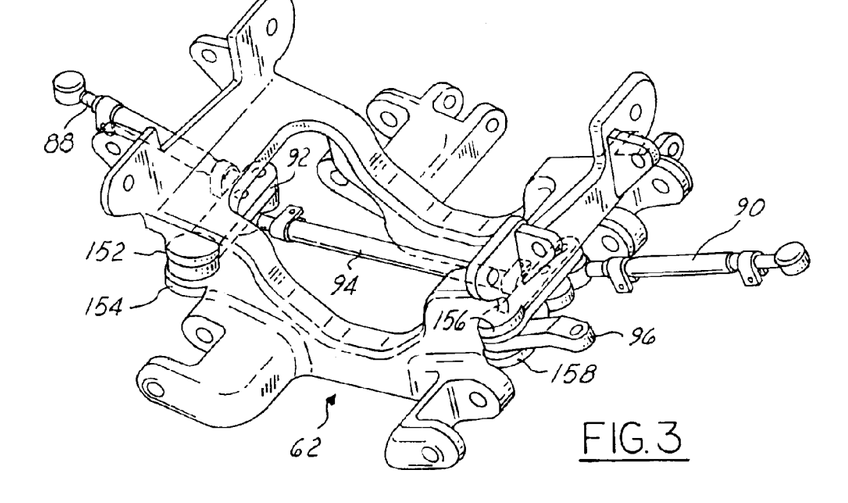
FIG. 3 is a perspective view of a subframe in accordance with the present invention supporting a steering linkage.
Figure 4:
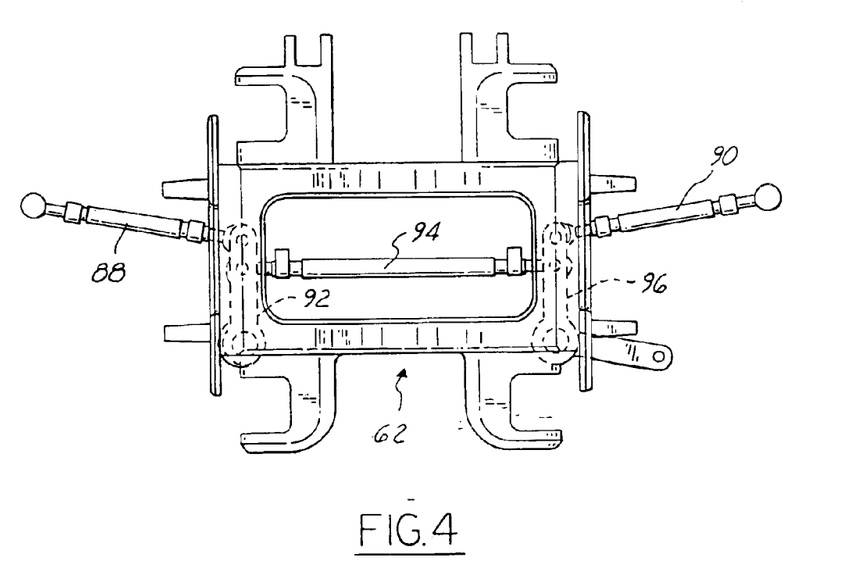
FIG. 4 is a top plan view of the subframe of FIG. 3 supporting a steering linkage.

Steering linkage 60 provides directional control of the vehicle wheels (not shown) responsive to driver control of the steering wheel (not shown) by transferring motion of the steering gear output shaft (not shown) to the vehicle wheels. Linkage 60 is conventional in the art. Referring to FIGS. 3 and 4, linkage 60 may include outer tie rods 88, 90, an idler arm 92, a cross link 94, and a bell crank 96. Tie rods 88, 90 are connected to the steering knuckles (not shown) at their outboard ends and to idler arm 92 and bell crank 96, respectively, at their inboard ends. Cross link 94 couples idler arm 92 and bell crank 96. Bell crank 96 is in turn coupled to a steering gear output shaft (not shown) by a drag link (not shown). Crank 96 rotates responsive to rotation of the steering gear output shaft and causes corresponding movement in link 94, arm 92, and tie rods 88, 90 to turn the vehicle wheels (not shown).

Figure 5:
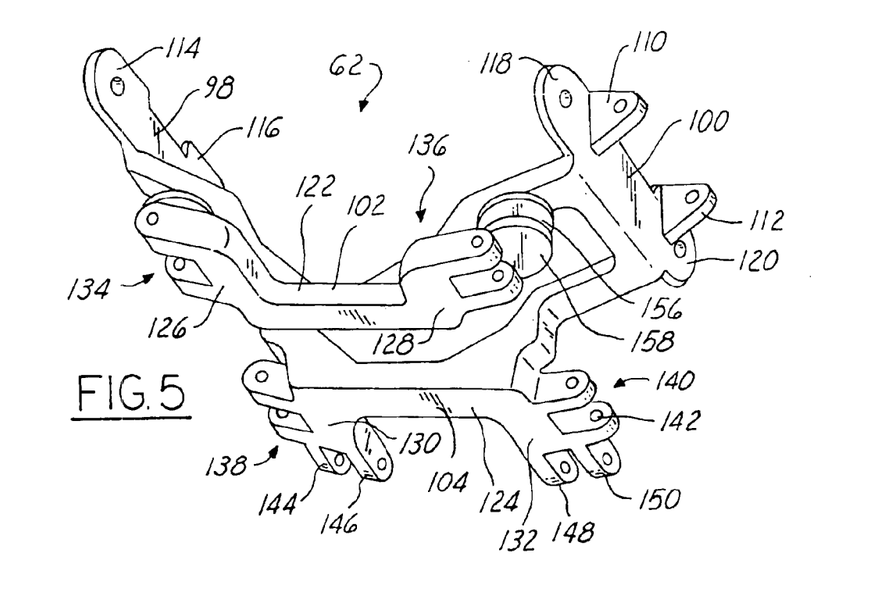
FIGS. 5 and 6 are perspective views of a first embodiment of a subframe in accordance with the present invention.
Figure 6:
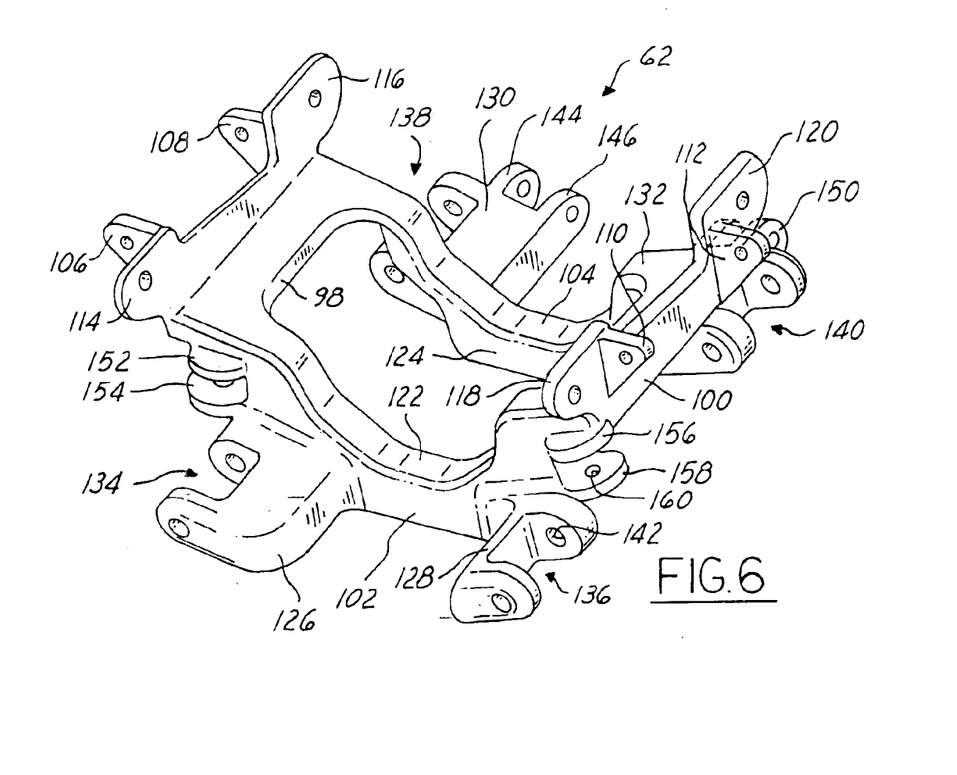

Referring now to FIGS. 5–6, a subframe 62 in accordance with one embodiment of the present invention will be described. Subframe 62 is provided to increase the transverse strength of the axle on which subassembly 22 is employed and may be cast from aluminum. Subframe 62 is unitary in construction and includes a pair of side members 98, 100 and a pair of cross members 102, 104.

Side members 98, 100 extend generally parallel to axis 28 when subframe 62 is mounted to frame 20. Each of members 98, 100 includes a pair of mounting flanges 106, 108 and 110, 112, respectively, extending therefrom in a direction generally perpendicular to axis 28. Flanges 106, 108 and 110, 112 are configured to receive corresponding upper control arms 44, 46 (and particularly bushings 64 of arms 44, 46) therebetween and include apertures 114 configured to receive bolts, screws, or other fasteners to pivotally couple upper suspension control arms 44, 46 to subframe 62. Members 98, 100 may also include mounting flanges 114, 116 and 118, 120, respectively, extending therefrom in a direction generally parallel to axis 28. Referring to FIG. 1, flanges 114, 116 and 118, 120 are configured to receive bolts, screws, or other fasteners to couple subframe 62 to mounting brackets 40, 42 of frame 20.

Cross members 102, 104 extend generally perpendicular to axis 28 when subframe 62 is mounted to frame 20. Each of cross members 102, 104 is integral with each of side members 98, 100. In the illustrated embodiment, each cross member 102, 104 includes a central portion, 122, 124, respectively, and two end portions, 126, 128 and 130, 132, respectively, that extend upwardly at an angle from portions 122, 124 to connect cross members 102, 104 to side members 98, 100. Each of end portions 126, 128, 130, 132 define means for mounting lower suspension control arms 48, 50 to subframe 62. In the illustrated embodiment, the mounting means comprise C-shaped mounting members 134, 136, 138, 140 extending outwardly from portions 126, 128, 130, 132 of members 102, 104 in a direction generally parallel to axis 28. Members 134, 136, 138, 140 are sized to receive bushings 78 of arms 48, 50 and include apertures 142 configured to receive bolts, screws, or other fasteners used to couple bushings 78 to members 134, 136, 138, 140. Members 138, 140 may themselves also include means for mounting strut rods 56, 58 (best shown in FIG. 1) to subframe 62. In particular, each of members 138, 140 may include a pair of mounting flanges 144, 146 and 148, 150, respectively, extending from members 138, 140 in a direction generally parallel to axis 28. Flanges 144, 146 and 148, 150 are configured to receive bushings 86 of rods 56, 58 therebetween and include apertures configured to receive bolts, screws, or other fasteners used to pivotally couple strut rods 56, 58 to subframe 62.

Side members 98, 100 and cross member 102 may be further configured to receive steering linkage 60. In particular, members 98, 100, 102 may define pairs of spaced mounting plates 152, 154, 156, 158 configured to receive portions of steering linkage 60. Referring to FIGS. 3 and 4, plates 152, 154 may be configured to receive idler arm 92 while plates 156, 158 may be configured to receive bell crank 96. Plates 152, 154, 156, 158 include apertures 160 configured to receive a shaft or pin (not shown) on which arm 92 and crank 96, respectively, may be pivotally mounted.

Figure 7:
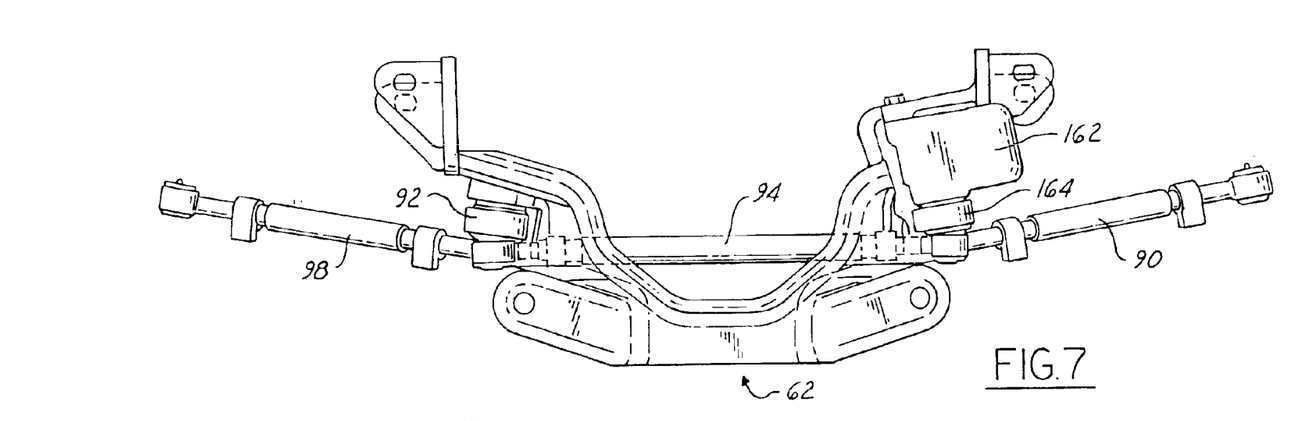
FIG. 7 is a front plan view of the subframe of FIGS. 3 and 4 reconfigured to support a steering gear.

Referring to FIG. 7, in a further enhancement of the present invention, subframe 62 may be configured to receive a steering gear 162 and the steering linkage 60 may be modified by replacing bell crank 96 with a pitman arm 164. The incorporation of steering gear 162 is advantageous because it eliminates the need for bell crank 96 and a separate drag link connecting crank 96 to the steering gear. The pitman arm 164 connects linkage 60 to the steering column through steering gear 162 and moves linkage 60 left or right.

A subframe 62 in accordance with the present invention represents a significant improvement as compared to conventional subframes used in heavy truck applications. Because the side members 98, 100, cross members 102, 104, and mounting features on subframe 62 are all integral with one another, there are no bolts, welds, or other fasteners required to build subframe 62. As a result, assembly time and cost is reduced. More importantly, however, better dimensional control of suspension and steering mounting points is ensured as tolerance stackups are limited. The subframe 62 also allows relatively easy manufacture and production of a subassembly 22 including many of the conventional suspension and steering components. Further, the subframe 62 is relatively light as compared to conventional subframes, requires less space, and allows the vehicle engine to be mounted lower to the ground, thereby increasing cab space.

It should be understood by those of skill in the art that the size, shape, and configuration of a subframe in accordance with the present invention may vary depending upon the design requirements associated with the frame, suspension, steering, and other components of the vehicle on which the subframe is to be mounted. As such, the embodiment illustrated in FIGS. 5–6 and described hereinabove is not meant to limit the scope of the claimed invention. Rather, a subframe in accordance with the present invention may assume a variety of forms-one example of which is illustrated in FIG. 8.

Figure 8:
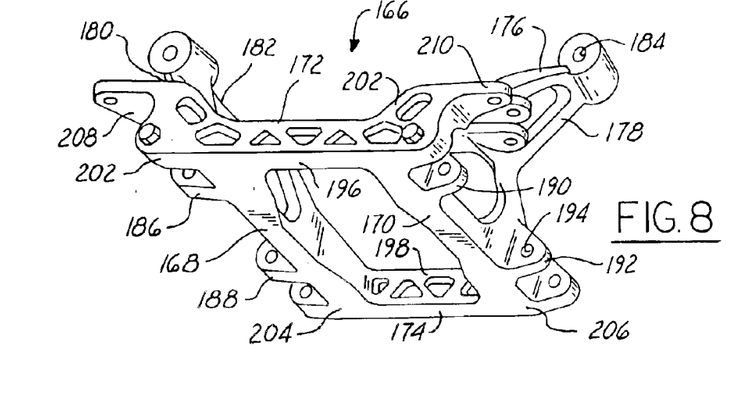
FIG. 8 is a perspective view of a second embodiment of a subframe in accordance with the present invention.

Referring now to FIG. 8, a second embodiment of a subframe 166 in accordance with the present invention will be described. Like subframe 62, subframe 166 includes a pair of side members 168, 170 and a pair of cross members 172, 174.

Side members 168, 170 extend generally parallel to axis 28 when subframe 166 is mounted to frame 20 and are located inboard of the outboard ends of cross members 172, 174. Each of members 168, 170 includes a pair of intersecting support arms 176, 178 and 180, 182, respectively, extending therefrom in a generally outboard direction. Arms 176, 178 and 180, 182, respectively, include axially extending apertures 184 at the point of intersection configured to receive a screw, bolt, or other fastener to couple upper suspension control arms (not shown) thereto and allow pivoting motion of upper suspension control arms. Each of members 168, 170 also includes a pair of mounting flanges 186, 188 and 190, 192, respectively, extending therefrom in a direction generally perpendicular to axis. Flanges 186, 188 and 190, 192, together with the outboard ends of cross members 172, 174, are configured to receive corresponding lower suspension control arms (and particularly bushings of the arm arms-not shown) therebetween and include apertures 194 configured to receive bolts, screws, or other fasteners to couple the lower suspension control arms to subframe 166.

Cross members 172, 174 extend generally perpendicular to axis 28 when subframe 166 is mounted to frame 20. Each of cross members 172, 174 is integral with each of side members 168, 170. In the illustrated embodiment, each cross member 172, 174 includes a central portion 196, 198, respectively, and two end portions 200, 202 and 204, 206, respectively, that extend upwardly at an angle from portions 196, 198. End portions 200, 202 may define mounting flanges 208, 210, respectively, extending therefrom in a direction generally perpendicular to axis 28. Flanges 208, 210 are configured to receive bolts, screws, or other fasteners to couple subframe 166 to mounting brackets 40, 42 of frame 20 (not shown). It should be understood that end portions 204, 206 may define similar mounting flanges (not shown).

Although not illustrated in the present embodiment, it should be understood that member 174 may also define means for mounting strut rods 56, 58 to subframe 166 in a manner similar to members 104 of subframe 62 (see FIG. 3 and 4). Also, side members 168, 170 and another of cross member 172 may be further configured to receive steering linkage 60. In particular, members 168, 170, 172 may define pairs of mounting plates configured to receive portions of steering linkage 60 in a manner similar to subframe 62.

Figure 9:
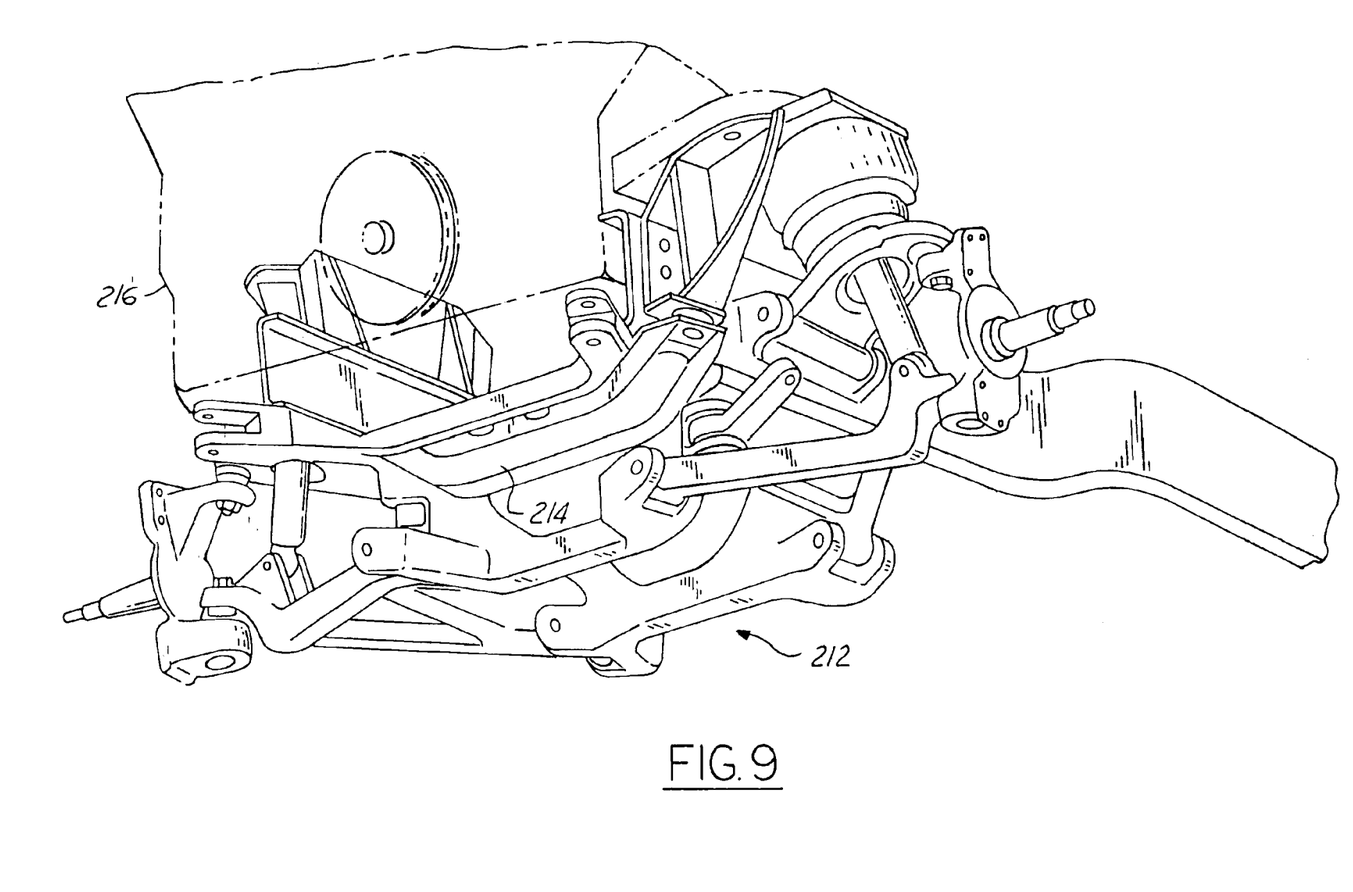
FIG. 9 is a perspective view of a third embodiment of a subframe in accordance with the present invention mounted to a vehicle frame.

Referring now to FIG. 9, a third embodiment of a subframe 212 in accordance with the present invention will be described. Subframe 212 is substantially similar to subframe 62. Subframe 212, however, includes a cross member 214 that is integral with the other components of subframe 212. As illustrated in FIG. 9, member 214 is provided to support the vehicle engine and may take the place of cross member 34 of frame 20 shown in FIGS. 1–2. Member 214 extends generally transverse to axis 28. It should be understood that the size, shape, and configuration of member 214 may vary depending upon design requirements associated with the vehicle engine and frame 20.

While the invention has been particularly shown and described with reference to the preferred embodiments thereof, it is well understood by those skilled in the art that various changes and modifications can be made in the invention without departing from the spirit and scope of the invention.

We claim:

1. A subframe for a motor vehicle, comprising:

first and second side members;

first and second cross members, each of said first and second cross members connected to said first and second side members; and a third cross member connected to said first and second side members, said third cross member configured to support an engine of said vehicle wherein said first and second side members and said first and second cross members are configured to receive first and second lower suspension control arms and first and second upper suspension control arms.

2. A subframe for a motor vehicle, comprising:

first and second side members;

first and second cross members, each of said first and second cross members connected to said first and second side members;

wherein said first and second side members and said first and second cross members are configured to receive first and second lower suspension control arms and first and second upper suspension control arms and said first cross member is configured to receive a first end of a strut rod, said strut rod having a second end coupled to a frame of said motor vehicle.

3. The subframe of claim 2 wherein said second end of said strut rod is coupled to one of first and second C-shaped longitudinal frame rails of said frame.

4. A subframe for a motor vehicle, comprising:

first and second side members;

first and second cross members, each of said first and second cross members connected to said first and second side members; and, a third cross member connected to said first and second side members, said third cross member configured to support an engine of said vehicle wherein said first and second side members and said first and second cross members are configured to receive first and second lower suspension control arms, first and second upper suspension control arms and a steering linkage.

5. A subframe for a motor vehicle, comprising:

first and second side members; and, first and second cross members, each of said first and second cross members connected to said first and second side members wherein said first and second side members and said first and second cross members are configured to receive first and second lower suspension control arms, first and second upper suspension control arms and a steering linkage and said first cross member is configured to receive a first end of a strut rod, said strut rod having a second end coupled to a frame of said motor vehicle.

6. A subframe for a motor vehicle, comprising:

first and second side members; and, first and second cross members, each of said first and second cross members connected to said first and second side members wherein said first and second side members and said first and second cross members are configured to receive first and second lower suspension control arms, first and second upper suspension control arms and a steering linkage and said first and second side members and said first and second cross members are configured to receive a steering gear.

7. A vehicle subassembly, comprising:

a subframe having first and second side members; and, first and second cross members, each of said first and second cross members connected to said first and second side members;

first and second lower suspension control arms coupled to said subframe; and, first and second upper suspension control arms coupled to said subframe wherein said subframe includes a third cross member connected to said first and second side members, said third cross member configured to support an engine of said vehicle.

8. A vehicle subassembly, comprising:

a subframe having first and second side members; and, first and second cross members, each of said first and second cross members connected to said first and second side members;

first and second lower suspension control arms coupled to said subframe;

first and second upper suspension control arms coupled to said subframe; and, a steering gear mounted on said subframe.

* * * * *